United States Patent Office 3,794,613
Patented Feb. 26, 1974

3,794,613
CHLORINATED POLYETHYLENE-ORGANIC POLYISOCYANATE ADHESIVE FOR LAMINATING CHLORINATED POLYOLEFIN FILM OR SHEET MATERIALS TO FABRIC
Joseph Drasner, Rockaway, N.J., assignor to The Dow Chemical Company, Midland, Mich.
No Drawing. Original application July 20, 1970, Ser. No. 56,738, now Patent No. 3,674,597. Divided and this application Dec. 15, 1971, Ser. No. 208,435
Int. Cl. C08f 45/28, 45/30
U.S. Cl. 260—33.6 UA       2 Claims

ABSTRACT OF THE DISCLOSURE

An improved adhesive for laminating preformed, chlorinated polyolefin film or sheet material to a fabric substrate, wherein such adhesive consists essentially of an admixture of (1) a substantially amorphous chlorinated polyethylene and (2) from about 25 to 50 parts by weight per 100 parts of (1) of an organic polyisocyanate.

BACKGROUND OF THE INVENTION

This is a division of application Ser. No. 56,738, filed July 20, 1970, now U.S. Pat. 3,674,597.

Heretofore, the formation of strong bonds between preformed chlorinated polyolefin film or sheet materials to fabric substrates have been difficult to obtain. Prior attempts to form bonds between various covering materials and fabric substrates have included the application of an organic polyisocyanate primer to the surface of the fabric to be covered, as disclosed by U.S. Pat. 3,060,070 when bonding chlorosulfonated polyethylene rubber to nylon fibers; or by use of a tie coat such as a low molecular weight chlorinated polyethylene resin as disclosed by U.S. Pat. 3,398,046 when bonding paper to a metal or resin surface.

SUMMARY OF THE INVENTION

It has been discovered, which discovery forms the present invention, that unexpectedly strong bonds are obtained between preformed chlorinated polyolefin film or sheet materials and a fabric substrate by use of an adhesive material consisting of an admixture of (1) a substantially amorphous chlorinated polyethylene and (2) from about 25 to 50 parts by weight per 100 parts of (1) of an organic polyisocyanate. That use of such admixture is significantly more effective as an adhesive for bonding preformed chlorinated polyethylene film to a nylon fabric substrate, as compared to the use of a chlorinated polyethylene tie coat with or without the prior application of an organic polyisocyanate binder, for the nylon fabric is set forth on Table I of Example I, infra.

DESCRIPTION OF THE PREFERRED EMBODIMENTS

The preformed chlorinated polyolefin film or sheet materials which may be effectively bonded to a fabric substrate by use of the adhesive of the present invention includes any chlorinated polyolefin film or sheet material containing from about 25 to about 70 weight percent chlorine, including the chlorinated polymers of ethylene, propylene and butylene and their interpolymers. Exemplary of particularly preferred such materials are those chlorinated linear polyethylenes having a chlorine content of 40%±3% by weight and containing about 5%–20% by weight of a material showing polyethylene crystallinity. These materials are specifically described in British Pat. 1,144,640.

As previously indicated, the adhesive material of the present invention may be composed of any substantially amorphous chlorinated polyethylene. Particularly preferred materials, however, are those containing from about 30 to 50 percent by weight chlorine and having a molecular weight of from about 50,000 up to about 500,000. Exemplary of especially preferred materials are those prepared by the process as set forth in copending application Ser. No. 742,107, filed May 16, 1968 by coworkers Carl R. Eckardt and William M. Bungo.

As indicated above, methylene bis(4-phenylisocyanate) is typical of a polyisocyanate suitable for use in preparing the adhesive of the present invention. Other organic polyisocyanates which may be used are polymethylene polyphenyl polyisocyanate having the formula:

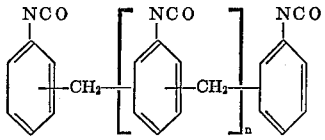

where $n$ is an integer, e.g., the product known as PAPI-1, in which $n$ has an average value of 1; 1,6-hexamethylene diisocyanate; 2,4-toluene diisocyanate; triphenylmethane triisocyanate; 3,3-dimethoxy-4,4'-biphenylene diisocyanate; p,p'-diphenylmethane diisocyanate, dianisidine diisocyanate; xylilene diisocyanate; naphthalene diisocyanate; fluorene diisocyanate; and dimers, trimers and polymers of the above. Also included are the isocyanate adducts of polyhydroxyl compounds such as addition products of toluene diisocyanate with castor oil, trimethylol propane, glycerine, hydroxyl terminated polyethers, hydroxyl terminated polyesters; blocked isocyanates such as reaction products of toluene diisocyanate and phenol or cresol; and the ortho bis chloroformates: wherein such organic polyisocyanates are present in the adhesive compositions in amounts ranging from between about 25 to 50 parts by weight per 100 parts of the substantially amorphous chlorinated polyethylene resin.

The adhesive compositions of this invention are useful in laminating any natural or synthetic woven, non-woven or knitted fabric to the preformed chlorinated polyolefin film or sheet material, e.g., fabric materials prepared from polyesters, such as polyethylene terephthalate; the acrylics, such as acrylonitrile; the vinyl polymers such as vinyl chloride, vinylidene chloride, vinyl acetate, ethylene, propylene, vinylidene fluoride, tetrafluoroethylene as well as copolymers and interpolymers thereof such as Saran and Dynel; and cotton and glass. Particularly good results are obtained, however, when utilizing nylon fabrics and especially those fabrics of relatively tight woven structure.

The adhesive compositions may be applied in any convenient manner. It is often preferred, however, to first apply the same to the fabric from an organic solvent solution, e.g., from a solution or dispersion thereof in toluene, xylene or a chlorinated or alkylated aromatic solvent, therefore such as monochlorobenzene, the furans, e.g., tetrahydrofurans, and the chlorinated aliphatic solvents such as perchloroethylene; followed by lamination of the preformed chlorinated polyolefin film to the coated fabric.

EXAMPLE (A) Preparation of the adhesive composition

To 100 parts of chlorinated polyethylene having a chlorine content of about 40 percent by weight and a relative crystallinity of zero, such material being prepared by chlorination in aqueous suspension of a linear polyethylene having an average molecular weight of 150,000, wherein up to 35 percent chlorine was introduced at a temperature of 100° C. with the remaining chlorine introduced at a temperature of 140° C., was added 2 parts of the diglycidyl ether of bisphenol A and 1 part of a lubricant. The resin and additives were then milled for 10 minutes with roll and stock temperatures of 300° F. and 310° F. respectively. The milled stock was then dissolved in hot toluene (55–70° C.) to provide a solution containing about 5 percent solids. To 100 grams of the solution was then added two grams of the organic polyisocyanate, polymethylene polyphenyl isocyanate, with the resultant formation of a solution having a viscosity at 25° C. of about 25 cps.

(B) Preparation of the laminate structure

A 22 x 22 x 840 denier nylon fabric having a weight of 5.0 oz./yd.² was dipped into the adhesive solution to form a tie coat having a dried weight of about 0.5 oz./yd.². Thereafter to both sides of the coated fabric was laminated a preformed chlorinated polyethylene film prepared from the same type of chlorinated polyethylene used in preparing the adhesive composition and having a thickness of about 5.5 mils.

The lamination cycle consisted of two minutes under an applied pressure of about 110 p.s.i. at a temperature of 325° F.; followed by an additional two minutes under 710 p.s.i. at 325° F.

Adhesion test samples were prepared by molding together two laminates forming a T-shaped peel sample using a cycle of three minutes under 410 p.s.i. at 325° F. followed by cooling under 550 p.s.i. pressure. This laminate is herein after referred to as Sample A.

For purposes of comparison, the following additional laminates were prepared and tested as described above.

Comparative Sample No. 1: Lamination of preformed chlorinated polyethylene film directly to nylon fabric, i.e., without any adhesive.

Comparative Sample No. 2: Lamination of preformed chlorinated polyethylene film to nylon fabric using an adhesive composed entirely of the chlorinated polyethylene ingredient of the herein described adhesive composition, i.e., a toluene solution containing 5 percent by weight of chlorinated polyethylene.

Comparative Sample No. 3: Lamination of preformed chlorinated polyethylene film to nylon fabric using an adhesive composed entirely of the organic polyisocyanate, polymethylene polyphenyl isocyanate, i.e., a toluene solution containing 2 percent by weight of such organic polyisocyanate.

The following Table I sets forth the adhesion in lb./2" width for each laminate structure.

TABLE I

| Sample identification | Adhesive composition | Adhesion (lb./2" width) |
|---|---|---|
| The invention: sample A | CPE plus PAPI | 30 |
| For comparison: | | |
| 1 | No adhesive | 7 |
| 2 | CPE only | 6 |
| 3 | PAPI only | 14 |

The above data illustrate a very significant and unexpected enhancement in adhesion obtained by use of an adhesive composition contemplated by the present invention.

What is claimed is:

1. An adhesive composition for bonding preformed chlorinated polyolefin film or sheet materials to nylon substrates said composition consisting essentially of a mixture of (1) a substantially amorphous chlorinated polyethylene containing from about 30 to 50 percent by weight of chemically combined chlorine and having a molecular weight of from about 50,000 to 500,000 and (2) from about 25 to 50 parts per 100 parts of (1) of polymethylene polyphenyl polyisocyanate having the formula

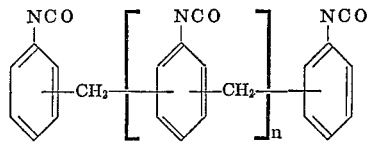

where $n$ is an integer having an average value of 1, said mixture being dispersed in an organic solvent.

2. The adhesive composition of claim 1 wherein said solvent is toluene.

References Cited

UNITED STATES PATENTS

| 3,227,781 | 1/1966 | Klug | 260—33.6 UA |
| 2,959,562 | 11/1960 | Klug | 260—33.8 UA |
| 3,594,449 | 7/1971 | Binder | 260—859 |
| 3,282,883 | 11/1966 | De Crease | 260—94.9 GB |

ALLAN LIEBERMAN, Primary Examiner

P. R. MICHL, Assistant Examiner

U.S. Cl. X.R.

156—331; 260—30.4 R, 33.8 UA